United States Patent [19]

Fox et al.

[11] 4,446,417

[45] May 1, 1984

[54] VOLTAGE REGULATOR FOR AIRCRAFT GENERATORS

[75] Inventors: David A. Fox, Shawnee Township, Allen County; Lynn L. Tipton, American Township, Allen County, both of Ohio

[73] Assignee: Westinghouse Electric Corp., Pittsburgh, Pa.

[21] Appl. No.: 348,395

[22] Filed: Feb. 12, 1982

[51] Int. Cl.³ .......................... H02P 9/00; H02H 7/06
[52] U.S. Cl. ........................................ 322/25; 322/28; 322/59; 322/73
[58] Field of Search ....................... 322/25, 27, 28, 59, 322/73, 99

[56] References Cited

U.S. PATENT DOCUMENTS

| | | | |
|---|---|---|---|
| 3,486,106 | 12/1969 | Dietl | 322/25 |
| 4,032,835 | 6/1977 | Finnel et al. | 322/25 X |
| 4,044,296 | 8/1977 | Dhyanchand et al. | 322/25 |
| 4,264,856 | 4/1981 | Frierdich et al. | 322/25 |
| 4,346,337 | 8/1982 | Watrous | 322/25 |
| 4,360,772 | 11/1982 | Voss | 322/99 X |

Primary Examiner—R. J. Hickey
Attorney, Agent, or Firm—R. P. Lenart

[57] ABSTRACT

A voltage regulator for aircraft generators controls generator output voltage by controlling exciter field current. Exciter field current sensors and generator output voltage sensors produce control signals which are proportional to exciter field current and generator voltage. These signals are combined and compared with a reference voltage signal by a comparator. A current controller regulates exciter field current in response to the comparator output.

6 Claims, 2 Drawing Figures

VOLTAGE REGULATOR FOR AIRCRAFT GENERATORS

BACKGROUND AND SUMMARY OF THE INVENTION

This invention relates to voltage regulators and more particularly to voltage regulators for aircraft generators.

Aircraft generator voltage regulators which regulate generator output voltage by controlling exciter field current are well known. These regulators generally utilize a feedback loop that includes a voltage sensor which produces a voltage signal proportional to generator output voltage, an amplifier which amplifies this signal, and a means for controlling exciter field current in response to the amplified voltage signal.

Aircraft generators (e.g., synchronous AC machines with brushless excitation) have requirements in common with generators for other applications but also have requirements for high reliability and performance in a compact and cost effective arrangement. The generator control unit, including the voltage regulator, is part of the generator system that must meet a high level of performance. While the subject matter of the present invention has particular advantage in aircraft generator systems, it is not limited to such applications.

Early regulators utilized series compensation techniques to improve transient performance. In these systems, a filter circuit was inserted in the feedback loop to compensate for the exciter time constant. However, circuit time constants vary with changing environmental conditions, such as temperature changes. This limited the effectiveness of series compensation circuits.

Minor loop feedback techniques were developed to achieve improved stability and transient response. In these systems, a signal proportional to the voltage regulator output voltage is fed back to the input of the amplifier in the major feedback loop. Although this results in improved performance, the circuit does not provide adequate performance for wide spread range systems, such as DC link systems with a converter in the closed loop.

Negative exciter field forcing is used to improve transient response time. This is accomplished by inserting an active current limiter, such as a transistor, in series with the exciter field coil. By turning off the transistor, a rapid reduction in field current is achieved.

If negative exciter field forcing is used in combination with a minor loop feedback circuit, the feedback signal which is derived from the voltage regulator output voltage cannot respond to the negative field forcing. The regulator then treats the negative field forcing as a disturbance, rather than a correction. Therefore transient response is degraded considerably.

The present invention incorporates an improved feedback technique which utilizes the exciter field current rather than voltage. The exciter field current accurately reflects the exciter output voltage and is therefore more useful in representing a state variable of the machine. Components of previous feedback circuits which attempted to model the exciter time constant have been eliminated since the time constant is accurately represented by the exciter field current.

A voltage regulator constructed in accordance with the present invention includes means for sensing exciter field current and for producing a signal proportional to the current. In addition, a voltage sensing means produces a second signal proportional to the output voltage of the generator. These two signals are combined to produce a third signal which goes to a comparator for comparison with a reference signal. The comparator produces a fourth signal in response to the difference between the reference signal and the third signal. A current controlling means responds to this fourth signal to control the exciter field current.

DESCRIPTION OF THE PREFERRED EMBODIMENT

Figure 1:
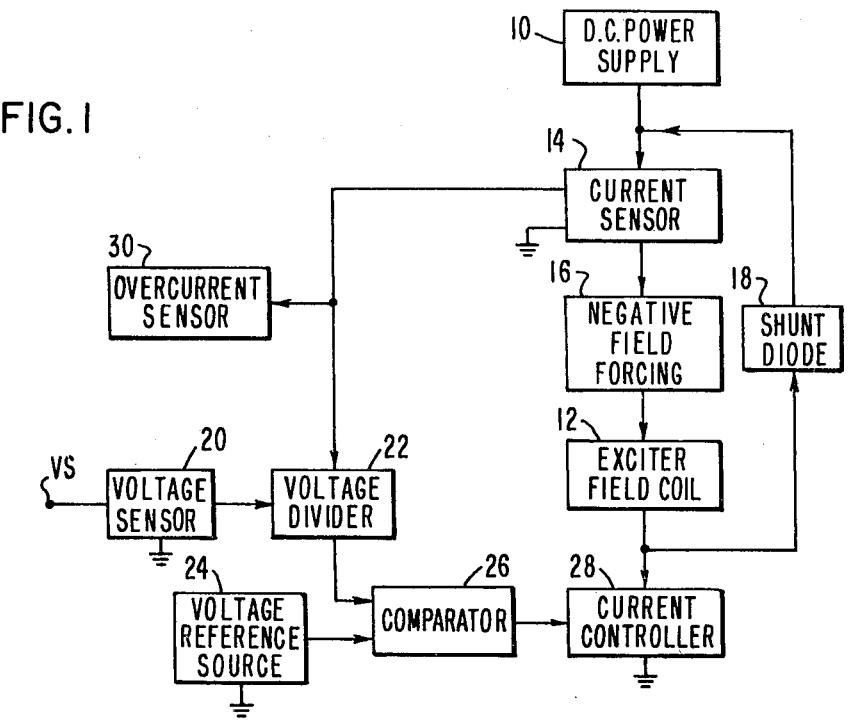
FIG. 1 is a block diagram of a voltage regulator system employing a voltage regulator in accordance with the present invention.

Referring to the drawings, FIG. 1 is a block diagram of a voltage regulator system employing a voltage regulator in accordance with the present invention. A source of power such as D.C. power supply 10 provides power to exciter field coil 12. Current sensor 14, which includes sensing means such as a shunt resistor or current transformer, provides a first signal which is proportional to exciter field current. Negative field forcing circuit 16 is connected in series with current sensor 14 and exciter field coil 12. Shunt diode 18 provides a path for current produced by the collapsing magnetic field of exciter field coil when exciter field coil current is interrupted.

Terminal VS is connected to a point in the generator circuit which is at a voltage level that is proportional to the generator output voltage. In a variable speed constant frequency system, terminal VS may be connected to the converter output. The voltage at terminal VS is sensed by voltage sensor 20 which produces a second signal proportional to the generator output voltage. Voltage divider 22 serves as a means for combining the first and second signal and for producing a third signal.

Voltage reference source 24 supplies a reference voltage which is compared with the third signal by comparator 26. A fourth signal, proportional to the difference between the third signal and the reference voltage is produced by comparator 26. Current controller 28 provides means for controlling exciter field coil current in response to the fourth signal.

Overcurrent sensor 30 is connected to the output of current sensor 14 to detect an overcurrent condition in the exciter field coil 12. An excessive current sensed by overcurrent sensor 30 will cause protective devices in the voltage regulator, not shown, to operate and remove the overcurrent condition.

Figure 2:
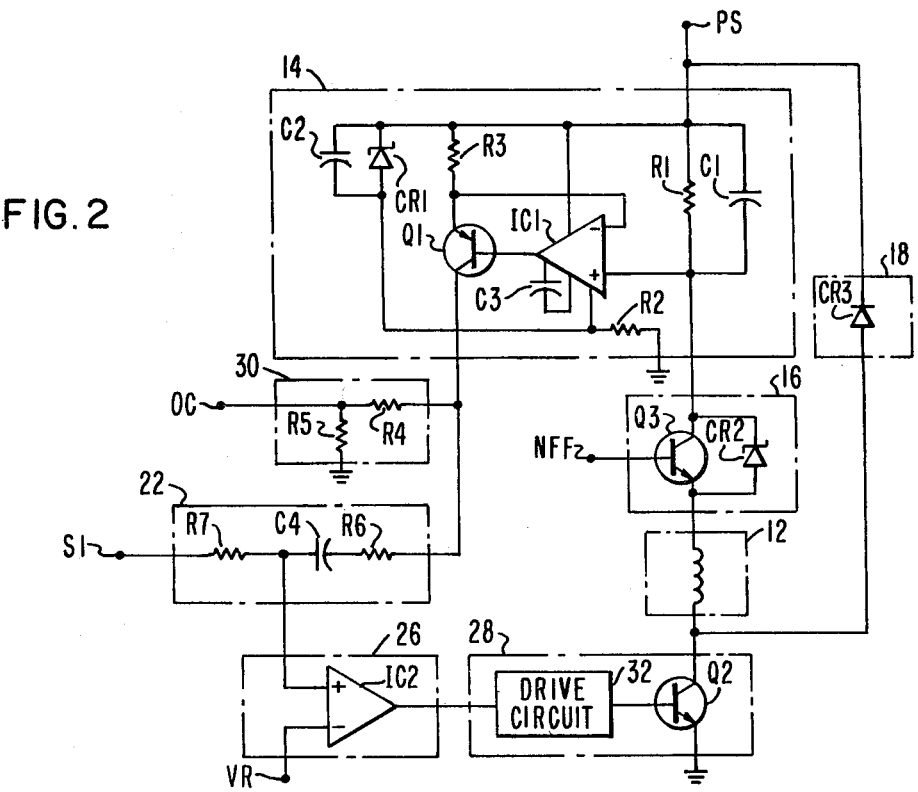
FIG. 2 is a schematic diagram of one embodiment of a circuit employing a voltage regulator in accordance with the present invention.

FIG. 2 is a schematic diagram of one embodiment of a circuit employing a voltage regulator in accordance with the present invention. A D.C. power supply, item 10 in FIG. 1, is connected to terminal PS to supply power to exciter field coil 12. Shunt R1 is connected in series with exciter field coil 12 and acts as a current sensing element in current sensor 14. Capacitor C1 in parallel with shunt R1 minimizes noise interference.

Capacitor C2, zener diode CR1, and resistor R2 are connected as shown to form a power supply referenced to terminal PS. The voltage developed across R1 is fed to operational amplifier IC1 which is connected to transistor Q1 and resistor R3 to form a current source in which the current in the collector of transistor Q1 is proportional to the exciter field current. Capacitor C3 stabilizes operational amplifier IC1.

Resistors R4 and R5 are connected in series between the collector of transistor Q1 and ground. Consequently, a first ground referenced voltage signal which is proportional to exciter field current, is developed at the junction between R4 and the collector of Q1.

Resistors R4 and R5 also serve as an overcurrent sensor 30 with the voltage at the junction between resistors R4 and R5 being proportional to exciter field current. This voltage is connected to conventional overcurrent protective circuitry, not shown, by way of terminal OC.

A second voltage signal from voltage sensor 20 in FIG. 1 is connected to terminal S1. Voltage divider 22 serves as a means for combining the first and second voltage signals and comprises the series connection of capacitor C4 and resistors R6 and R7. Capacitor C4 blocks D.C. voltage which would produce an error in the steady state regulated voltage. The combination of resistor R6 and capacitor C4 may be tuned to improve circuit response. The voltage appearing at the junction of resistor R7 and capacitor C4 represents a third signal which closely reflects the state of the exciter and thus provides stability compensation.

This third signal is fed to operational amplifier IC2 of comparator 26 where it is compared with a reference voltage supplied to terminal VR from voltage reference source 24 in FIG. 1. Comparator 26 produces a fourth signal which is fed to drive circuit 32 of current controller 28. Conventional circuitry of drive circuit 32 controls transistor Q2 in response to the fourth signal from comparator 26.

Negative field forcing circuit 16 includes transistor Q3 and zener diode CR2. Transistor Q3 is driven by known circuitry via terminal NFF. Shunt diode 18 provides a path for current generated by the collapsing magnetic field of exciter field coil 12 when exciter field coil current is decreased as a result of transistor Q2 or Q3 being turned off. Since the cathode of shunt diode 18 is connected between terminal PS and current sensor 14, shunt resistor R1 remains in the current loop and continues to sense the actual exciter field coil current.

A voltage regulator circuit in accordance with this invention has been constructed and its performance has been evaluated on a DC link system. Significant improvement in transient response has been seen upon the removal of 42 KW and 60 KW loads. Recovery from load removals has been shown to be up to two times faster than with a prior art minor loop feedback circuit.

By way of further example, the following table identifies specific components which may be used in a voltage regulator in accordance with one embodiment of this invention as shown in FIG. 2. It will be apparent to those skilled in the art that other components may be used within the scope of this invention. For example, the level of feedback may be adjusted by changing the value of resistor R4.

RESISTORS

R1: 0.1Ω shunt
R2: 10K
R3: 125Ω
R4: 800Ω
R5: 1.1K
R6: 3.9K
R7: 10K

CAPACITORS

C1: 1 μf
C2: 1 μf
C3: 100pf
C4: 0.33 μf

DIODES

CR1: 15v zener
CR2: 168v zener
CR3: 200v/9 amp

TRANSISTORS

Q1: 2N5416
Q2: 2N6546
Q3: 2N6546

OPERATIONAL AMPLIFIERS

IC1: 101A
IC2: LM124

What is claimed is:

1. A voltage regulator circuit for a generator with an exciter field coil, said circuit comprising;
    means for sensing current in said exciter field coil and for producing a first voltage signal proportional to said current;
    means for sensing voltage derived from the output voltage of said generator and for producing a second voltage signal proportional to said voltage;
    means for combining said first voltage signal and said second voltage signal and for producing a third voltage signal, wherein said means for combining the first voltage signal and the second voltage signal is a branch circuit including, the series connection of a first resistor, a capacitor, and a second resistor, with the capacitor being connected between said first and second resistors;
    said first and second voltage signals being impressed on opposite ends of said branch circuit with said second voltage signal being impressed on one end of said second resistor, to produce said third voltage signal at the connection point between the capacitor and the second resistor;
    a source of reference voltage;
    means for comparing said third voltage signal with said reference voltage and for producing a fourth voltage signal;
    means for controlling current in said excitier field coil, responsive to said fourth voltage signal.

2. A voltage regulator circuit as recited in claim 1, further comprising:
    a field forcing circuit connected in series with said exciter field coil.

3. A voltage regulator circuit as recited in claim 1, wherein said means for controlling current is a transistor.

4. A voltage regulator circuit as recited in claim 1, wherein said means for comparing said third voltage signal with said reference voltage is an operational amplifier having positive and negative input terminals:
    said third voltage signal being connected to said positive input terminal; and
    said reference voltage being connected to said negative input terminal.

5. A voltage regulator circuit as recited in claim 1, further including means for sensing an overcurrent condition in said exciter field coil.

6. A voltage regulator circuit as recited in claim 5, wherein said means for sensing an overcurrent condition comprises a branch circuit connected between said current sensing means and ground;
    said branch circuit including the series connection of two resistors.

* * * * *